(12) United States Patent  
Pickles (10) Patent No.: US 6,663,407 B1
(45) Date of Patent: Dec. 16, 2003

(54) CARD EDGE CONNECTOR HAVING LATCHES

(75) Inventor: Charles S. Pickles, York, PA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/233,030

(22) Filed: Aug. 30, 2002

(51) Int. Cl.[7] .............................................. H01R 13/62
(52) U.S. Cl. ...................................... 439/328; 439/326
(58) Field of Search ................................ 439/325–328, 439/629–637, 567

(56) References Cited

U.S. PATENT DOCUMENTS

| | | | |
|---|---|---|---|
| 5,689,405 A | * 11/1997 | Bethurum | .................... 361/737 |
| 5,836,780 A | 11/1998 | Mizumura et al. | |
| 5,997,331 A | * 12/1999 | Tu | ............................. 439/328 |
| 5,997,332 A | * 12/1999 | Choy | ......................... 439/328 |
| 6,027,357 A | 2/2000 | Howell et al. | |
| 6,042,411 A | 3/2000 | Choy | |
| 6,106,318 A | 8/2000 | Chiu | |
| 6,129,572 A | * 10/2000 | Feldman et al. | ............ 439/328 |
| 6,164,998 A | * 12/2000 | Poi et al. | ..................... 439/326 |
| 6,276,951 B1 | 8/2001 | Chen et al. | |
| 6,540,550 B2 | * 4/2003 | Chang et al. | ............ 439/541.5 |

OTHER PUBLICATIONS

Mini PCI card edge connector http://www.fciconnect.com/pdffiles/datasheets/950505–008.pdf.

* cited by examiner

Primary Examiner—Hien Vu
(74) Attorney, Agent, or Firm—Wei Te Chung (57) ABSTRACT

A card edge connector for electrically connecting a circuit card to a mother board includes an insulative housing having an elongated base and a pair of supporting arms extending perpendicularly from opposite lateral ends of the base, a number of conductive terminals, and a pair of latch members disposed at free ends of the pair of supporting arms. Each latch member has a latch tab for bearing against an upper surface of the circuit card and reliably locking the circuit card. The base defines an elongated slot along a longitudinal direction thereof and a number of passageways disposed by two sides of the slot for receiving the conductive terminals therein. Each terminal extends into the slot for engagement with the inserted circuit card.

6 Claims, 8 Drawing Sheets

CARD EDGE CONNECTOR HAVING LATCHES

BACKGROUND OF THE INVENTION

1. Field of the Invention

The present invention relates to an electrical connector, and more particularly to a card edge connector having latches for securing a circuit card in the connector.

2. Description of Prior Art

Card edge connectors are widely used in personal computers and other electronic equipments for electrical connection of printed circuit boards or other similar electronic components to a mother board. In applications, a mating edge of a printed circuit board is received within a suitable connector, and cooperating terminals or contacts provide the necessary electrical interconnection between the printed circuit board and the connector. Since the printed circuit board is plugged into the connector, the circuit board need to be securely affixed to the connector; otherwise, any vibration could cause the engaged contacts to separate from each other. Any such disruption may cause a break in circuitry or a possible shorting thereof.

In order to prevent such electronic components from being disconnected from the connector during operation, these card edge connectors are usually equipped with latching devices. For example, U.S. Pat. No. 5,836,780 discloses such a card edge connector. The card edge connector has an insulative housing having an elongated base and a pair of side walls extending laterally from opposite ends of the base. Each side wall has an abutment surface for abutment with an inserted card. A pair of engaging sections is provided on tops of arm sections defined in the side walls, which is able to deflect outwardly so that the card can pass the engaging sections. As best shown in FIG. 3 of the patent, the arm sections and the engaging sections constitute a "latch structure" for holding the card with its opposite sides in abutment with the abutment surfaces of the side walls. However, the elasticity of the latch structure is insufficient to withstand repeated card insertion/withdrawal operations. After a long term of use, the arm sections tend to rupture and the whole card edge connector is thus damaged.

Referring to http://www.fciconnect.com/pdffiles/datasheets/950505-008.pdf, a Mini PCI card edge connector is disclosed with over molded plastic latches. Each arm section of the housing has a protrusion at a free end thereof which functions as a latch. When the protrusions engage with a Mini PCI card, the protrusions deflect elastically and outwardly. At the same time, the whole arm sections outwardly deflect correspondingly. However, repeated operations may also cause the arm sections to be broken. Besides, it is difficult to release the Mini PCI card from the connector and it is inconvenient to operate by a user.

U.S. Pat. No. 6,106,318 provides a memory module socket with latches. The latches extend from opposite sides of the housing of the socket for engaging and disengaging a memory module. Each latch comprises a lock portion extending from the housing. The lock portion comprises an engaging member and a resilient metal plate. The resilient plate is insert molded in the lock portion for increasing the strength of the latch. However, this design complicates the manufacturing process and thus decreases the production efficiency of the socket.

U.S. Pat. Nos. 6,027,357 and 6,276,951 disclose other electrical connectors each having a pair of latch members. The latch members attached to the housing of the electrical connector are separately stamped and formed from a metal sheet. Although the latch members are proved to function well, the latch members are separate parts and are very complicated in structure, which is disadvantageous when taking the production cost into consideration.

U.S. Pat. No. 6,042,411 shows another card edge connector. The card edge connector has a latch device including a deflectable plastic member and a deflectable metal member. The plastic and metal members cooperatively lock an inserted card to the connector. Nevertheless, it still complicates the manufacturing process and increases the production cost of the connector.

Additionally, the circuit boards in the conventional card edge connectors disclosed in the aforementioned patents are withdrawn therefrom by outwardly pushing the latch members thereof. When these card edge connectors are arranged side by side, a large space of the mother board is needed to accommodate them, whereby two neighboring connectors can have a gap therebetween large enough to permit the outward operation of the latch members thereof. Estate of the mother board is more and more precious when the computers are made to be more and more compact.

Hence, in order to overcome the above-mentioned prior art shortcoming, it is necessary to provide a card edge connector having an improved latch member.

SUMMARY OF THE INVENTION

Accordingly, a first object of the present invention is to provide an electrical connector having latch members which can secure a circuit card to the electrical connector.

A second object of the present invention is to provide improved latch members for a card edge connector which have good resilience and facilitate manual withdrawal of a circuit card from the card edge connector.

A third object of the present invention is to provide improved latch members for a card edge connector which have a simple structure, thereby simplifying manufacturing process and reducing production cost.

A fourth object of the present invention is to provide improved latch members for a card edge connector which have a new latching method and a new card withdrawal method through squeezing the latch members inwardly, thereby allowing for side by side arrangement of connectors occupying a small space of a mother board.

In order to achieve the objects set forth, a card edge connector in accordance with the present invention comprises an insulative housing having an elongated base and a pair of supporting arms extending from opposite ends of the base, a plurality of conductive terminals fixed to the base and a pair of latch members disposed at free ends of the pair of supporting arms. Each latch member has a latch tab for locking a circuit card. The base defines an elongated slot along a longitudinal direction thereof and a plurality of passageways disposed by two sides of the slot for receiving the conductive terminals therein. Each terminal extends into the slot for engagement with the inserted circuit card.

Other objects, advantages and novel features of the invention will become more apparent from the following detailed description of the present embodiment when taken in conjunction with the accompanying drawings.

DETAILED DESCRIPTION OF THE INVENTION

Reference will now be made in detail to the preferred embodiment of the present invention.

Figure 1:
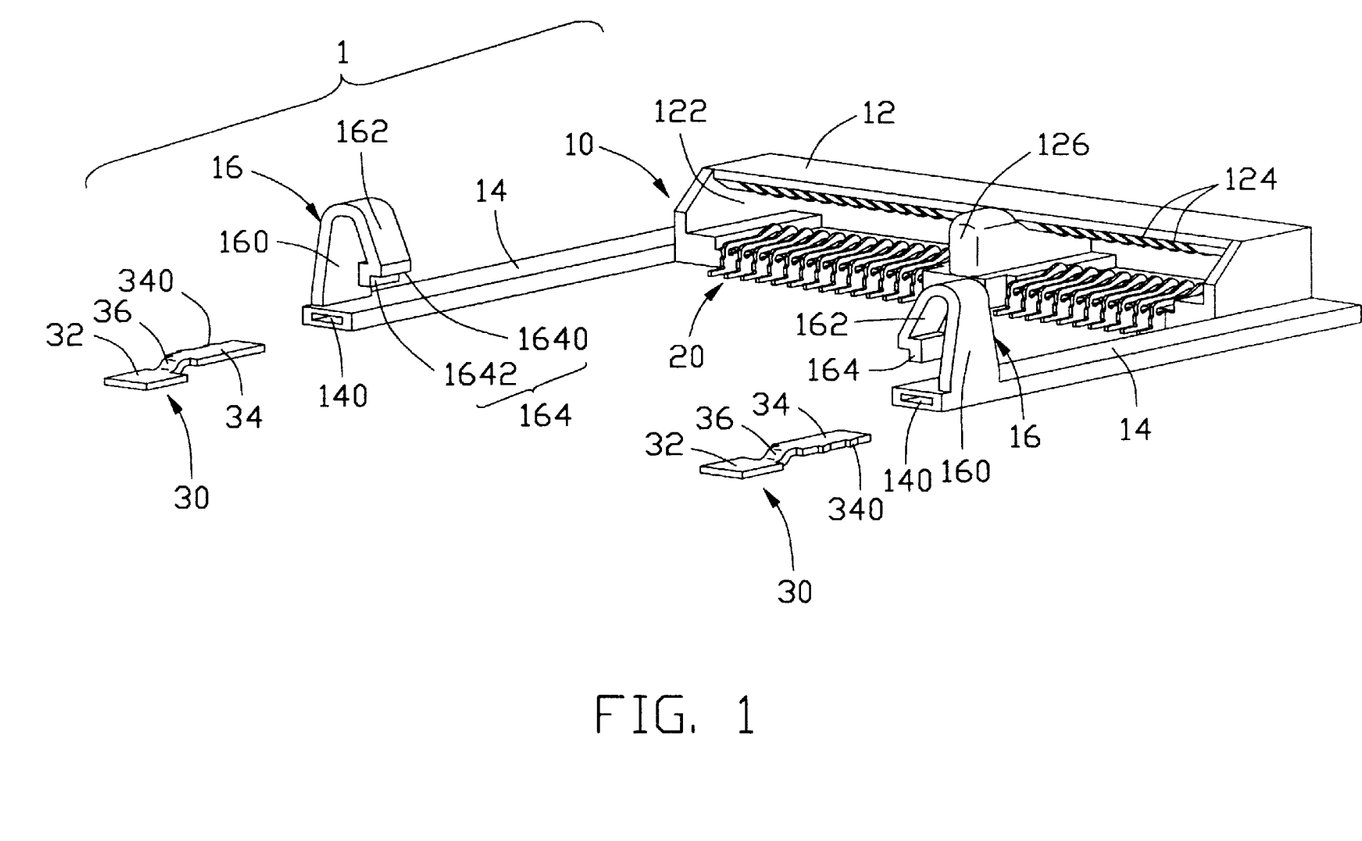
FIG. 1 is a partly exploded perspective view of a card edge connector in accordance with a first embodiment of the present invention.
Figure 2:
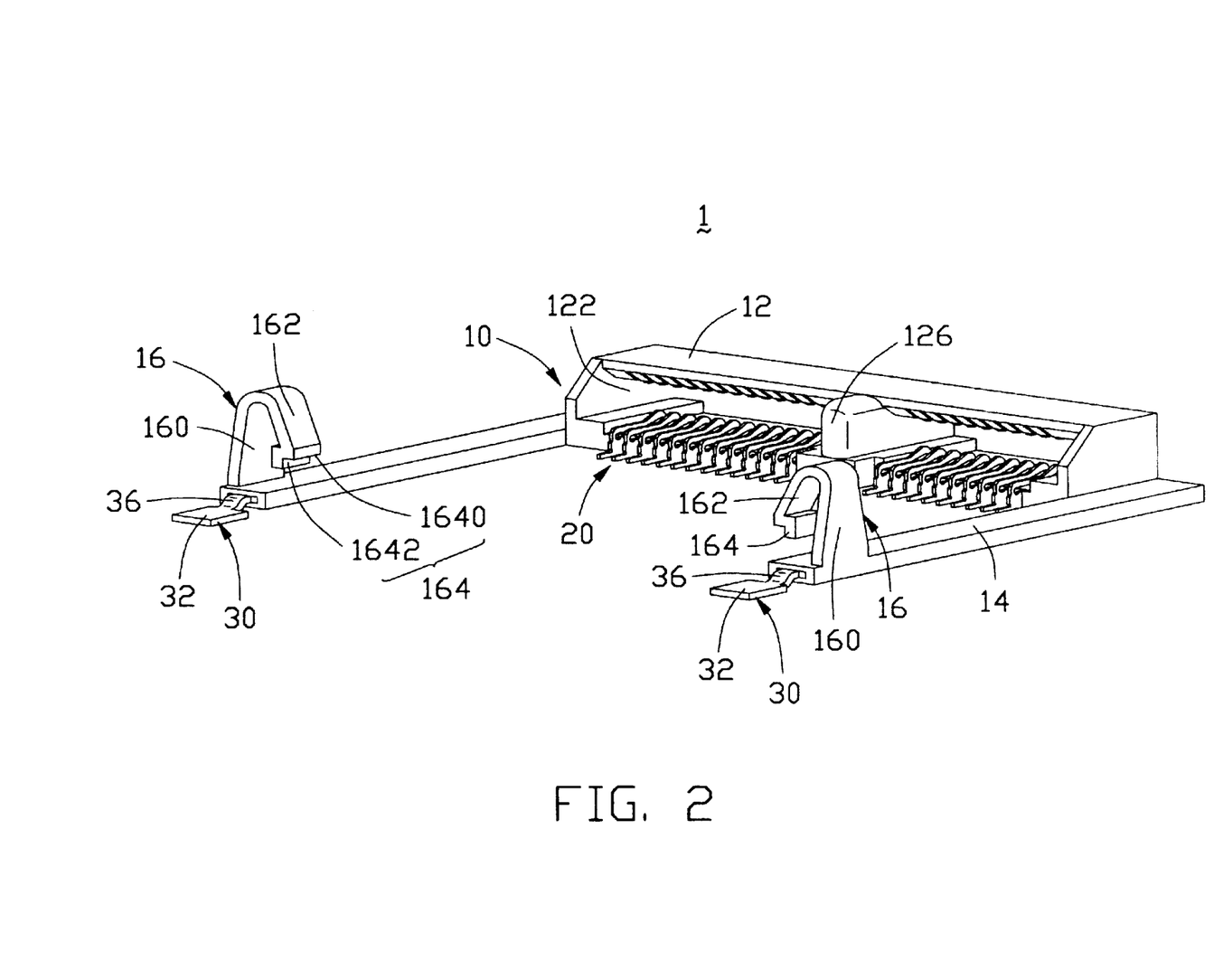
FIG. 2 is an assembled view of FIG. 1.

Referring to FIGS. 1 and 2, a card edge connector 1 for electrically connecting a circuit card 4 (shown in FIG. 3) to a mother board (not shown) in accordance with the present invention comprises an insulative housing 10 molded from an insulative material such as plastic, a plurality of conductive terminals 20 and a pair of engaging members 30.

The insulative housing 10 has an elongated base 12 and a pair of supporting arms 14 extending perpendicularly from opposite lateral ends of the base 12. The pair of supporting arms 14 defines a receiving space (not labeled) therebetween for receiving the circuit card 4. The base 12 defines an elongated slot 122 along a longitudinal direction thereof and a plurality of passageways 124 disposed by two sides of the slot 122 for receiving the plurality of conductive terminals 20 therein. Each terminal 20 extends into the slot 122 for engagement with the inserted circuit card 4. A key 126 is disposed in an off-center position of the slot 122 adapted to provide parallel alignment and polarization of the circuit card 4 relative to the connector 1. A latch 16 is formed at a free end of each supporting arm 14. The latch 16 is a plastic latch molded integrally with the insulative housing 10 of the card edge connector 1. The latch 16 includes a tapered plate 160 extending upwardly from a top surface of the supporting arm 14 for providing perpendicular alignment of the circuit card 4 relative to the connector 1, a curved portion 162 bent from the top of the tapered plate 160 to the receiving space and then extending downwardly for increasing resilience of the latch 16, and a latch tab 164 for locking the circuit card 4. The latch tab 164 includes a blocking portion 1640 extending horizontally from the bottom of the curved portion 162 towards the tapered plate 160 for engaging a top surface of the circuit card 4 and preventing the circuit card 4 from moving upwardly, and a touching portion 1642 extending downwardly from an outer end of the blocking portion 1640 for engaging a side surface of the circuit card 4 and preventing the circuit card 4 from moving sideways. The free end of each supporting arm 14 defines a cavity 140 for receiving the engaging member 30.

Each engaging member 30 comprises a soldering plate 32, a mating plate 34, and a slanting portion 36 connecting the soldering plate 32 and the mating plate 34. The soldering plate 32 is located lower than the mating plate 34. The mating plate 34 forms a plurality of barbs 340 on one side thereof for having an interferential fit with an inner wall of the cavity 140 to thereby reliably retain the mating plate 34 in the cavity 140. The soldering plate 32 is a square metal plate to be soldered on the mother board for increasing the joint force between the card edge connector 1 and the mother board.

Figure 3:
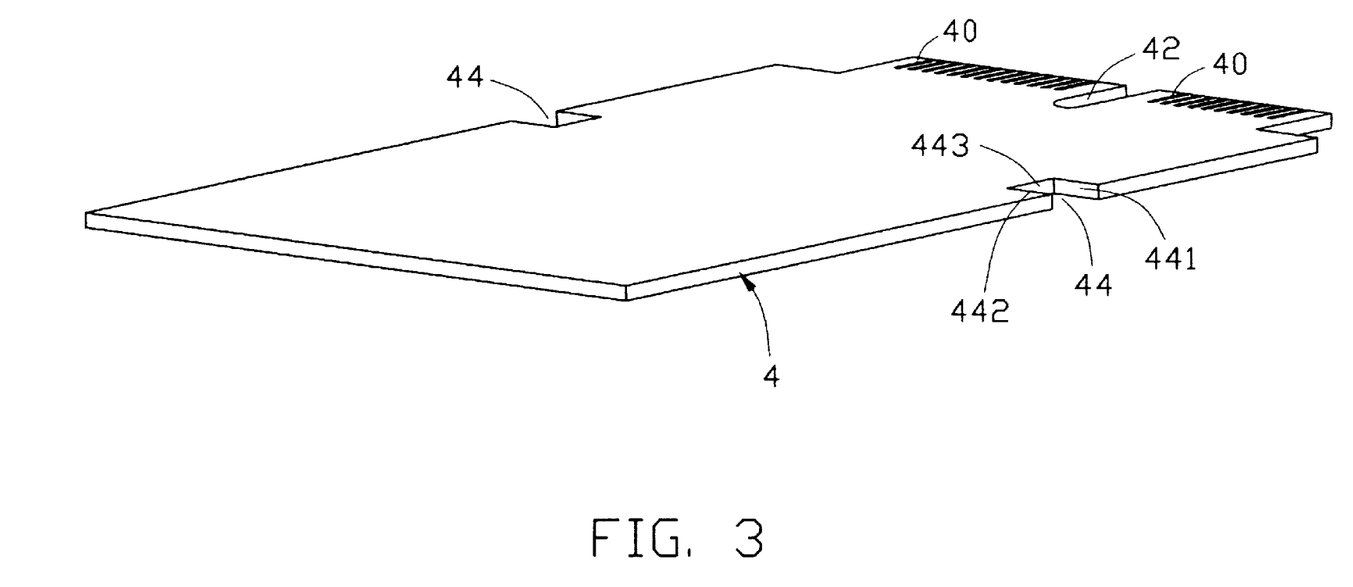
FIG. 3 is a perspective view of a circuit card for use with the card edge connector of FIG. 2.

Referring to FIG. 3, the circuit card 4 has two rows of contact pads 40 on the upper and lower surfaces of a mating end thereof, corresponding to the plurality of the conductive terminals 20 respectively. When the circuit card 4 is inserted into the card edge connector 1, the contact pads 40 are brought into contact with the conductive terminals 20 of the card edge connector 1. A keyway 42 is disposed in the mating end of the circuit card 4 corresponding to the key 126 of the insulative housing 10. Each side of the circuit card 4 defines a rectangular cutout 44 for receiving a corresponding latch 16. The circuit card 4 forms front and rear abutments 441, 442 and an inner abutment 443 in each of the cutouts 44.

Figure 4:
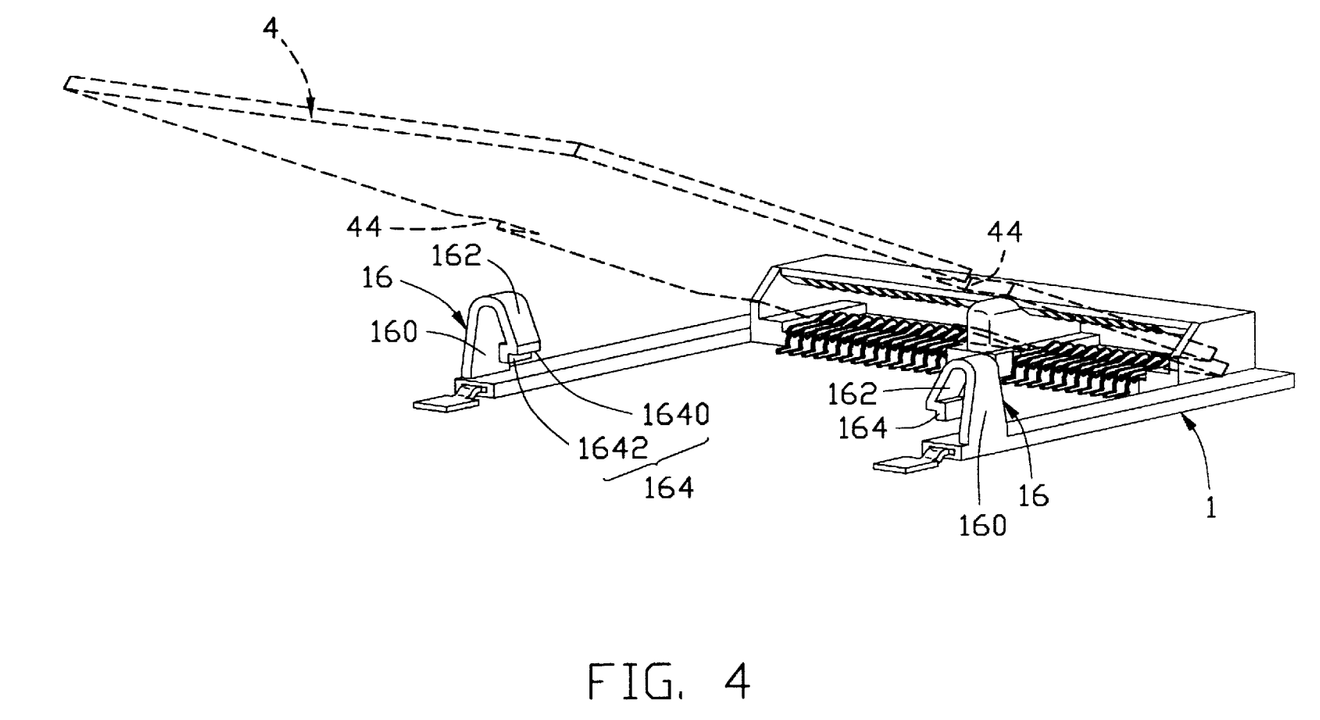
FIG. 4 is a perspective view of the card edge connector of FIG. 2 into which a circuit card is inserted but not fixed yet.
Figure 5:
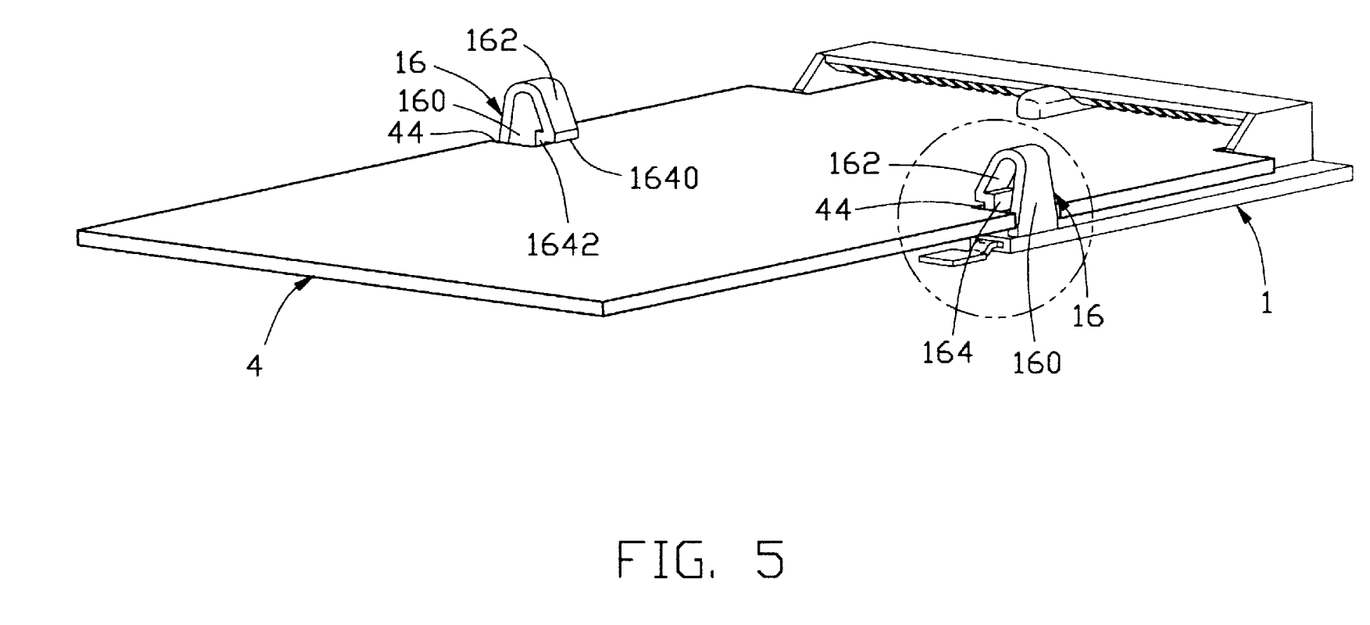
FIG. 5 is a perspective view of the card edge connector of FIG. 2 into which a circuit card is fixed.
Figure 6:
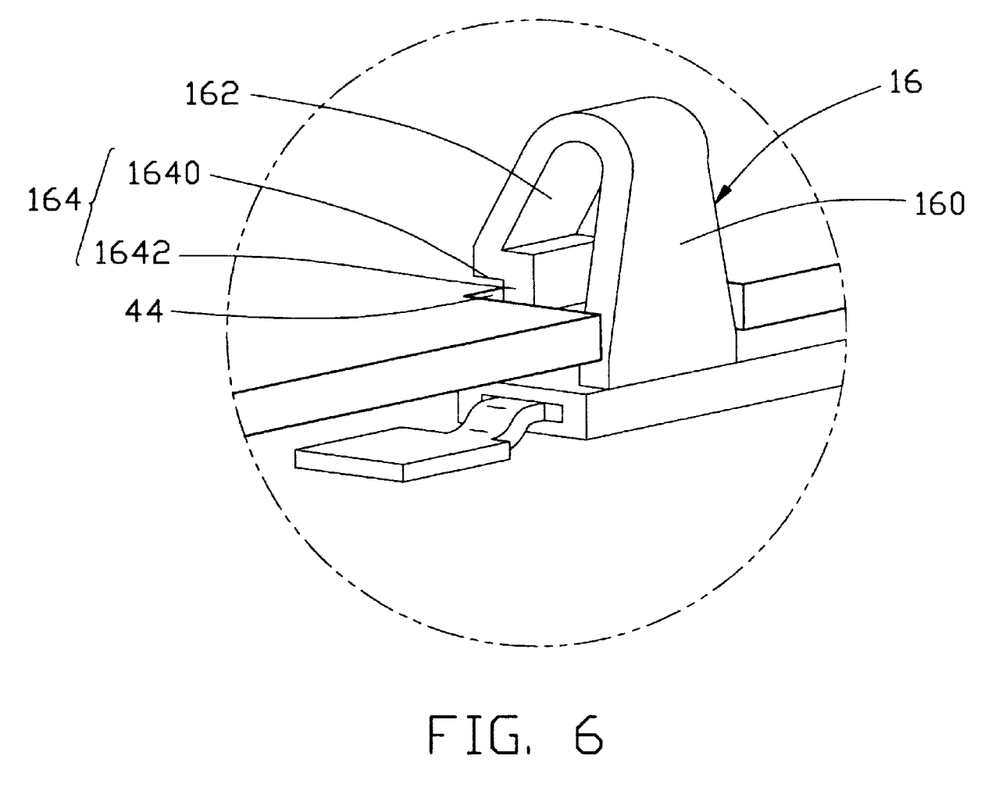
FIG. 6 is an enlarged view of a circled area of FIG. 5, showing a latch of the card edge connector and the circuit card interlocked with each other.

Referring to FIGS. 4–6, the circuit card 4 is inserted into the elongated slot 122 at an angle with regard to the insulative housing 10. The circuit card 4 is then pressed to a designated position. During the pressing process, the latches 16 pass through the cutouts 44 and deflect resiliently and outwardly. The tapered plates 160 of the latches 16 are received in outer portions of the cutouts 44 and engage with the front and rear abutments 441, 442. The latch tabs 164 of the latches 16 are fittingly received in inner portions of the rectangular cutouts 44 of the circuit card 4 with the blocking portions 1640 and the touching portions 1642 thereof respectively bearing against the upper surface of the circuit card 4 and the inner abutments 443, thereby locking the circuit card 4 to the card edge connector 1. As shown in FIG. 5, it is easy to withdraw the circuit card 4 from the card edge connector 1 by squeezing the curved portions 162 of the latches 16 towards the tapered plates 160. Accordingly, the supporting arms 14 need not to be pulled outwardly, thereby reducing required occupied space of the connector 1 on the mother board when several of the connectors 1 are side-by-side arranged on the mother board.

Figure 7:
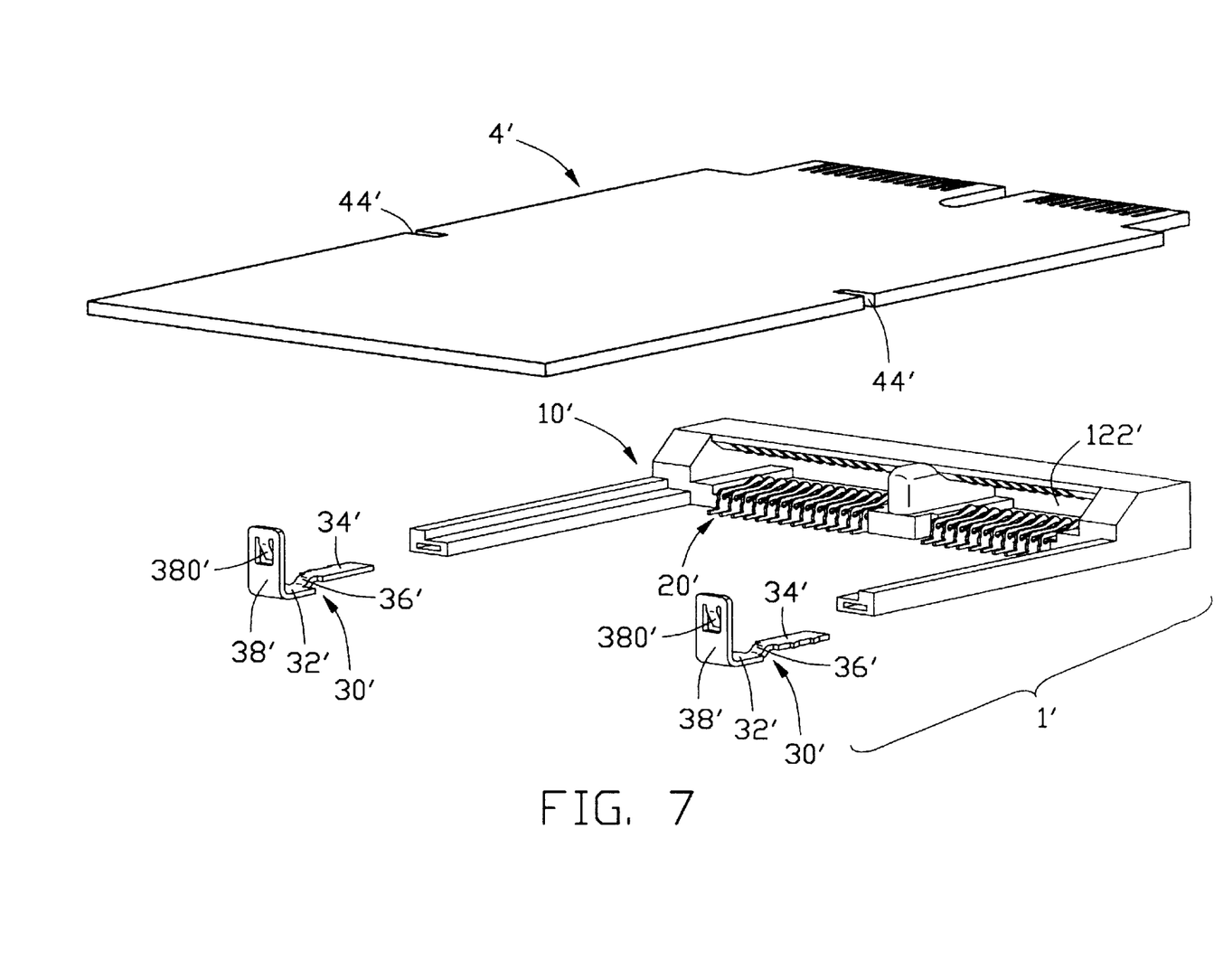
FIG. 7 is a partly exploded perspective view of a card edge connector according to a second embodiment of the present invention, and a circuit card to be inserted.
Figure 8:
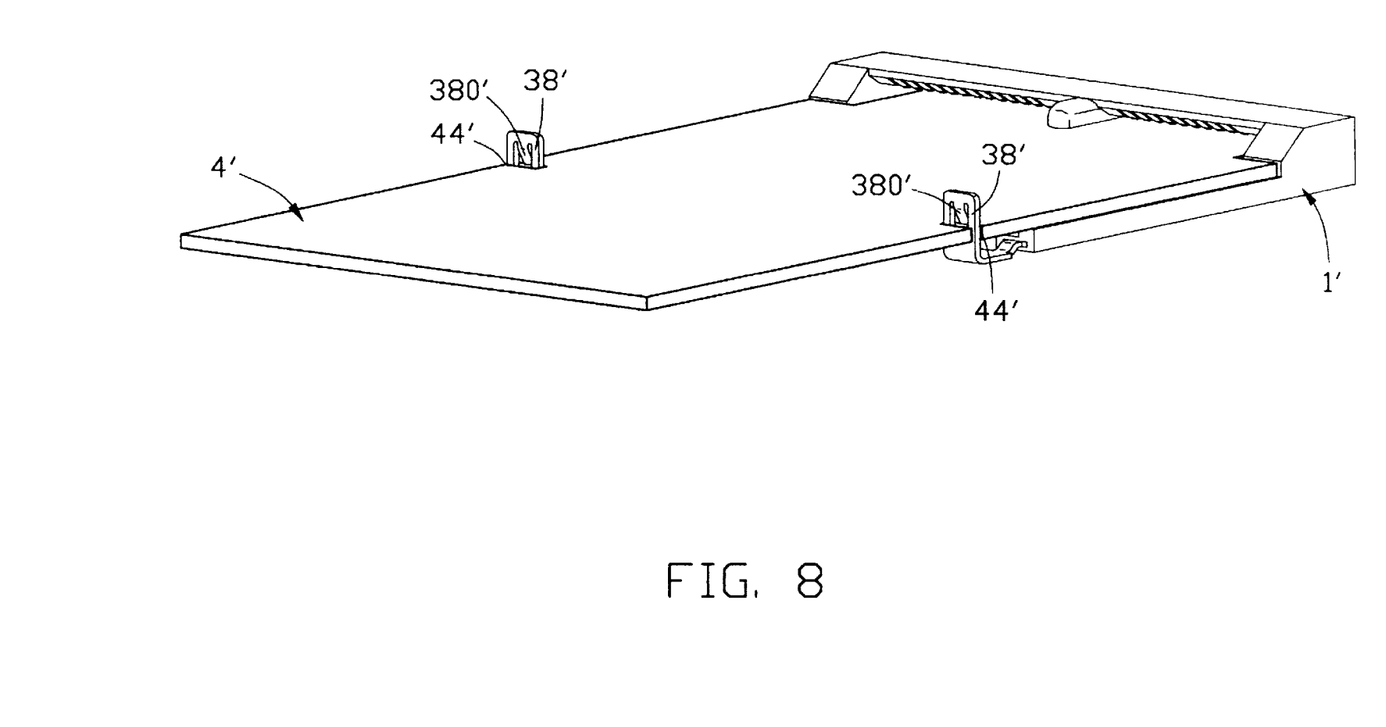
FIG. 8 is an assembled view of FIG. 7.

FIGS. 7 and 8 show a card edge connector 1' in accordance with a second embodiment of the present invention. In comparison with the first embodiment, the difference is that the latches of this embodiment are integrally formed with the engaging members.

As shown in FIGS. 7 and 8, the card edge connector 1' adopted for electrically connecting a circuit card 4' to a mother board (not shown) comprises an insulative housing 10', a plurality of conductive terminals 20' and a pair of latch members 30'. The pair of latch members 30' each is stamped from a metal sheet and attached to an arm (not labeled) of the insulative housing 10'. Each latch member 30' comprises a soldering plate 32', a mating plate 34', and a slanting portion 36' connecting the soldering plate 32' and the mating plate 34'. The soldering plate 32', the mating plate 34' and the slanting portion 36' are similar to the soldering plate 32, the mating plate 34 and the slanting portion 36 of the engaging member 30 of the first embodiment. A latch plate 38' extends perpendicularly and upwardly from a front end of each soldering plate 32'. A latch tab 380' is punched from a middle portion of each latch plate 38'. The latch tab 380' has good resilience. The circuit card 4' defines a pair of cutouts 44' in respective opposite sides thereof corresponding to the latch plates 38'. When the circuit card 4' is inserted into the elongated slot 122' of the card edge connector 1', the pair of latch plates 38' respectively engage with the pair of cutouts 44' of the circuit card 4' for stopping the circuit card 4 from moving sideways. The latch tabs 380' of the latch plates 38' bear against an upper surface of the circuit card 4' for preventing the circuit card 4' from moving upwardly, thereby firmly retaining the circuit card 4' in the card edge connector 1'. When withdrawing the circuit card 4' from the card edge connector 1', a user only needs to squeeze the latch tabs 380' of the latch plates 38' forwardly to a position away from the upper surface of the circuit card 4' and above the cutouts 44. Subsequently, the circuit card 4' leaps upwardly away from the latch tabs 380' of the latch plates 38', whereby the circuit card 4' can be easily taken out from the slot 122' of the housing 10'.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card edge connector assembly for electrically connecting a circuit card to a mother board, comprising:

an insulative housing having an elongated base and a pair of supporting arms extending perpendicularly from opposite lateral ends of the base, said base defining an elongated slot along a longitudinal direction thereof and a plurality of passageways beside the slot;

a plurality of conductive terminals received in corresponding passageways and extending into the slot for engagement with the circuit card inserted into the connector; and a pair of latches disposed at free ends of the pair of supporting arms, each latch having a latch tab for locking the circuit card, the latch tab comprising a blocking portion for bearing against an upper surface of the circuit card and a touching portion for engaging a side surface of the circuit card; wherein said latches are plastic latches molded integrally with the insulative housing: wherein each of said latches has a tapered plate extending upwardly from a top surface of the supporting arm and a curved portion bent inwardly and then downwardly from the top of the tapered plate; wherein the blocking portion of said latch tab extends horizontally from the bottom of the curved portion towards the tapered plate, and the touching portion extends downwardly from the blocking portion.

2. The card edge connector assembly as claimed in claim 1, further comprising a pair of engaging members each having a soldering plate adapted to be soldered on the mother board, a mating plate engaged with said supporting a and a slanting portion connecting the soldering plate and the mating plate.

3. The card edge connector assembly as claimed in claim 2, wherein each supporting arm defines a cavity at the free end for receiving the mating plate of a corresponding engaging member.

4. An electrical connector assembly comprising:

an electrical connector comprising:

an insulative housing having an elongated base and a pair of supporting arms integrally molded with the base and extending perpendicularly from opposite lateral ends of the base, said base defining an elongated slot along a longitudinal direction thereof and a plurality of passageways disposed beside of the slot, each supporting arm having a latch extending integrally and upwardly therefrom, each latch having a latch tab for locking a circuit card;

a plurality of conductive terminals received in corresponding passageways and extending into the slot; and a pair of engaging members each comprising a soldering plate adapted to be soldered on a mother board, a mating plate engaging in said supporting arm, and a slanting portion connecting the soldering plate and the mating plate; and a circuit card received in the slot and having two rows of contact pads on upper and lower surfaces of an edge thereof for mating with the conductive terminals, the circuit card further defining a pair of cutouts in opposite sides thereof for engaging with the pair of latches;

wherein the latches of the electrical connector project beyond the upper surface of the circuit card, and are subject to squeezing force to disengage from the circuit board when the circuit card is to be withdrawn from the electrical connector; wherein said latch has a tapered plate extending upwardly. from a top surface of said supporting arm for providing perpendicular alignment of the circuit card, wherein said latch has a curved portion bent inwardly and then downwardly from the top of the tapered plate.

5. The electrical connector assembly as claimed in claim 4, wherein said latch tab comprises a blocking portion extending horizontally from the bottom of the curved portion towards the tapered plate for bearing against the upper surface of the circuit card, and a touching portion extending downwardly from the blocking portion for engaging a side surface of the circuit card.

6. The electrical connector assembly as claimed in claim 4, wherein each supporting arm defines a cavity at a free end thereof for receiving the mating plate of the engaging member.

* * * * *